(12) United States Patent
Hunt

(10) Patent No.: US 6,549,323 B1
(45) Date of Patent: Apr. 15, 2003

(54) ACTIVE OPTICAL SYSTEM FOR PHASE-SHIFTING DESIRED PORTIONS OF AN INCOMING OPTICAL WAVEFRONT

(75) Inventor: Jeffrey H. Hunt, Chatsworth, CA (US)

(73) Assignee: The Boeing Company, Irvine, CA (US)

( * ) Notice: Subject to any disclaimer, the term of this patent is extended or adjusted under 35 U.S.C. 154(b) by 0 days.

(21) Appl. No.: 09/968,090

(22) Filed: Oct. 1, 2001

(51) Int. Cl.$^7$ ................................................. G02F 1/01
(52) U.S. Cl. ....................... 359/279; 359/290; 359/291; 359/298
(58) Field of Search ................. 359/290, 291, 359/298, 618, 619, 279, 246, 247, 249; 372/32

(56) References Cited

U.S. PATENT DOCUMENTS

| | | | |
|---|---|---|---|
| 5,396,364 A | 3/1995 | O'Meara et al. | 359/292 |
| 5,521,743 A | 5/1996 | Holmes et al. | 359/248 |
| 5,526,170 A * | 6/1996 | Esman et al. | 359/279 |
| 6,222,667 B1 | 4/2001 | Gobeli | 359/323 |

* cited by examiner

*Primary Examiner*—Hung Xuan Dang
*Assistant Examiner*—Tuyen Tra
(74) *Attorney, Agent, or Firm*—Lawrence N. Ginsberg

(57) ABSTRACT

A first control optics assembly receives an incoming optical wavefront and adjusts that incoming optical wavefront. A second control optics assembly receives a driver optical wavefront and adjusts that driver optical wavefront. A combiner receives an output from the first control optics assembly and an output from the second control optics assembly. The combiner provides a combined, co-linear output wavefront having an initial beam size. Spatial light modulator (SLM) addressing optics receives the combined, co-linear output wavefront and produces a desired beam size for the combined, co-linear output wavefront. The SLM receives the output from the SLM addressing optics and provides localized phased shifting of the resulting wavefront. SLM egressing optics receives the output of the SLM and returns the beam size of the wavefront to the initial beam size. The output of the SLM egressing element has desired portions of its phase shifted relative to the incoming optical wavefront.

16 Claims, 1 Drawing Sheet

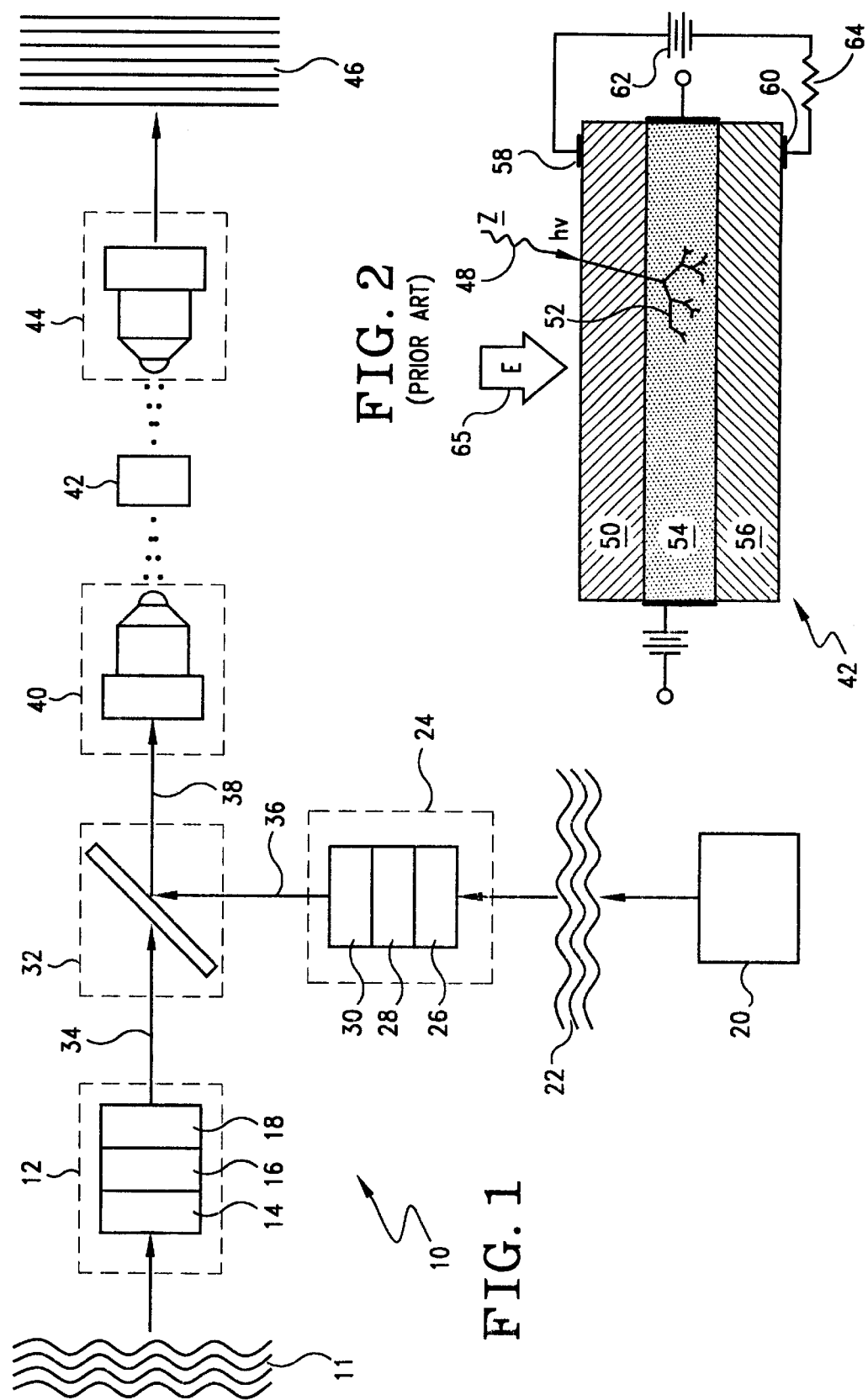

ACTIVE OPTICAL SYSTEM FOR PHASE-SHIFTING DESIRED PORTIONS OF AN INCOMING OPTICAL WAVEFRONT

BACKGROUND OF THE INVENTION

1. Field of the Invention

This invention relates to active optical systems and more particularly to an active optical system for phase-shifting desired portions of an incoming optical wavefront.

2. Description of the Related Art

Many types of active optical systems require the control of the optical wavefront or phase of a propagating laser beam. When an image propagates through turbid media, for example, the atmosphere, random fluctuations in the local index of refraction cause local fluctuations in the optical path length that the beam traverses. These fluctuations in path length lead to a randomization of the phase front contour, causing the image to be obscured. Using an adaptive optics or active optical control, the original phase state is restored, allowing the reconstruction of the original image. In the case of optical communications, the same kind of randomization can occur. In this case, the adverse result is that the optical beam cannot be focussed to a diffraction limited (limited by wavelength) spot, causing loss of information when the beam is introduced into a small diameter optical element, for example, an optical fiber. Active control and adaptive optics in this scenario allows one to reconstruct the original phase state so that the beam can be focussed to a small spot without loss of information. Typically, active optical systems make use of adaptive optical elements that are based on mechanical implementation. One example of this is a deformable mirror. The mirror contains a number of small actuators which push or pull on the mirror surface. In doing so, they compensate for the distortions in the beam phase by making some parts of the optical path shorter and some parts of the optical path longer. However, this implementation takes what is fundamentally an optical problem and turns it into a mechanical problem. It is desirable to use a non-mechanical system to accomplish the phase-shifting needed to recreate the original phase state of the optical beam.

There have been previous patents to use electro-optical means to perform adaptive optical processes. U.S. Pat. No. 5,396,364, entitled CONTINUOUSLY OPERATED SPATIAL LIGHT MODULATOR APPARATUS AND METHOD FOR ADAPTIVE OPTICS, issued to O'Meara et. al, discusses the use of a spatial light modulator for electro-optically addressed adaptive optics. A standard SLM is described, that incorporates an electronically "pixelized" modulator. The device incorporates a microlenslet array to physically separate the wavefront into small active areas that form the pixels. This device has several disadvantages. The electronic structure must be built directly into the device, causing greater difficulty in manufacture and limiting the resolution of the device to the number of electronic structures created. Also, since the modulation is caused by electronically driven means, instead of being optically driven, the speed of the device has inherent limitations.

U.S. Pat. No. 6,222,667, entitled ELECTRO-OPTIC LIGHT VALVE ARRAY, issued to Gobeli et, discloses a two-dimensional light valve array. It uses a pixelized substrate made of lanthanum modified zirconate-titanate. Electrodes are cut into recesses made in the substrate. Voltages which are applied to the individual pixels induce bi-refringence into the pixelized regions. Electronic control of the bi-refringence affects the light transmittance. The inventor does not discuss control of phase or wavefront in this device. As in O'Meara et.al. the device must be pixelized and electronic driving limits the speed at which controls can be performed.

SUMMARY

The present invention is an active optical system and method for phase-shifting desired portions of an incoming optical wavefront. A first control optics assembly receives an incoming optical wavefront and adjusts that incoming optical wavefront in accordance with first desired wavelength and beam propagation parameters. A driver element produces a driver optical wavefront. A second control optics assembly receives the driver optical wavefront and adjusts that driver optical wavefront in accordance with second desired wavelength and beam propagation parameters.

A combiner receives an output from the first control optics assembly and an output from the second control optics assembly. The combiner provides a combined, co-linear propagation output wavefront having an initial beam size. Spatial light modulator (SLM) addressing optics receives the combined, co-linear propagation output wavefront and produces a desired beam size for the combined, co-linear propagation output wavefront. The SLM receives the output from the SLM addressing optics and provides localized phased shifting of the resulting wavefront. SLM egressing optics receives the output of the SLM and returns the beam size of the wavefront to the initial beam size. The output of the SLM egressing element has desired portions of its phase shifted relative to the incoming optical wavefront.

The present performs phase control on an optical wavefront without utilizing a deformable mirror to compensate for phase distortions produced by atmospheric conditions. By altering the manner in which the imaging device is addressed, the local refractive index of the two-dimensional medium can be used to modulate or demodulate the wavefront at a single position within the wavefront. This results in a phase compensated wavefront.

BRIEF DESCRIPTION OF THE DRAWINGS

FIG. 1 is a schematic view of a preferred embodiment of the active optical system of the present invention.

FIG. 2 (Prior Art) is a cross-sectional view of a spatial light modulator utilized by the present invention.

DETAILED DESCRIPTION OF THE INVENTION

Referring to the drawings and the characters of reference marked thereon FIG. 1 illustrates a preferred embodiment of the present invention, designated generally as 10. An incoming optical wavefront 11 is received by a first control optics assembly, designated generally as 12. The wavefront of an optical beam is generally described as the contour of constant phase over the physical cross-section of the beam. Although any optical source will have a phase associated with it, in most cases, sources will be objects which are being imaged or will be from transmitters of digitally encoded optical beams. The first control optics assembly 12 adjusts the incoming optical wavefront 11 in accordance with desired wavelength and beam propagation parameters. These parameters could include, for example, precise wavelength filtering to the expected signal wavelength, the optical bandwidth of the incoming signal, or the polarization of the light. The wavelength may be controlled to fit within the detection range of the photodiode. It may be more precisely filtered to fit a known input signal, either from an image or from a digitally encoded communication beam. The present invention operates with wavelengths longer than 1 micron. The preferred minimum wavelength is about 1.1 micron. Optical signals from other sources at shorter wavelengths will effect the operation of the device and should therefore be eliminated. The assembly 12 preferably includes wavelength control element 14 such as a color filter, an etalon, a Fabry-Perot interferometer, a Fizeau interferometer, a diffraction grating, or a notch filter, etc. A polarization control element 16 polarizes the wavefront. This may comprise, for example, a polarization plate, a Brewster's angle polarizer, or a thin film polarizer. The precise polarizer to be selected depends on the particular application's engineering requirements such as polarization rejection ratio, size and weight of the polarizer, and the wavelength range over which the detector must operate, etc. The wavefront is then received by a propagation control element 18 such as a single lens, double lens, refractive elements, reflective elements or other system up to a fully engineered telescope.

A driver element 20 for encoding produces a driver optical wavefront 22. The driver element may comprise, for example, a laser, a light emitting diode (LED), or broadband optical light source.

A second control optics assembly 24 adjusts the driver optical wavefront 22 in accordance with desired wavelength and beam propagation parameters. The assembly 24 preferably includes wavelength control element 26 such as a color filter, an etalon, a Fabry-Perot interferometer, a Fizeau interferometer, a diffraction grating, or a notch filter. A polarization control element 28 and a propagation control element 30 are utilized, as described above.

A combiner 32 receives the output 34 from the first control optics assembly 12 and the output 36 from the second control optics assembly 24. The combiner 32 provides a combined, co-linear propagation output wavefront 38 having an initial beam size. In order for the phase-shifting to occur, the affected and driver beams must be physically registered in propagation space. The registration in propagation direction is achieved with appropriate timing, that is, the pulses enter the phase-shifter overlapped in time. The registration in the other two dimensions is accomplished by overlapping the physical cross-sections of the beams. The combiner 32 allows for this overlapping in cross-section to take place. The combiner 32 may include, for example, a beamsplitter, a dichroic optic, or a diffraction grating.

To provide the correct beam size for matching the SLM, an SLM addressing optics 40 are provided. The SLM addressing optics 40 may include, for example, a plurality of lenses or curved reflectors. Typically, the SLM 42 will be on the order of 1 millimeter in diameter, although this may vary somewhat depending on the application. The active area of the SLM is the only place where the desired phase-shifting physical effect can take place. Consequently, this step is essential to assure that both affected and driver beams enter that area of the detector.

The SLM 42 receives the output from the SLM addressing optics 40 and provides localized phased shifting of the resulting wavefront, as will be described in greater detail below. SLM egressing optics 44 receives the output of the SLM 42 and returns the beam size of the wavefront to the initial beam size, i.e. the beam size of output 38. The resulting waveform 46 has desired portions of its phase shifted relative to the incoming optical wavefront 10. Further optical processes may require a beam diameter that differs from that required for the SLM. These optics allow for the modification of the beam diameter or spot size.

Referring now to FIG. 2 a preferred embodiment of the SLM 42 is illustrated. This is fully described and claimed in U.S. Pat. No. 5,521,743, issued to Holmes et al, incorporated herein by reference. This Figure shows a cross section of a three-layer photon counting photorefractive spatial light modulator with avalanche photodiode structure. A photon 48 is shown striking a positive doped semiconductor layer 50, causing an avalanche 52 of electrons to be released, the second layer is either a negative layer or an insulator 54, and the third layer is a negative layer 56. A charge is placed across the device by electrodes 58 and 60 connected to voltage source 62 and circuit resistance 64. In this manner electric field 65 is created across the device and if the photodetector is properly designed, it can be operated in the Geiger mode.

The overall performance of the device is enhanced by hot-carrier assisted absorption, the Franz Keldysh effect and by Gunn domain formation. These effects enhance the photoionization and avalanche gain. A spiked or alternating voltage waveform can also increase the sensitivity of the device. The device can be stacked in parallel or in series for improved primary electron quantum efficiency or multi-wavelength operation.

Avalanche photoelectron gain and ohmic heating are combined to drive the thermo-optic effect, as may be observed in existing silicon avalanche photodiodes. Using the avalanche process, and operating in the Geiger mode, one photon can cause the excitation of hundreds of millions of carrier electrons in a semiconductor. By utilizing the electrical energy supplied by external fields, the optical energy of a single absorbed quantum is multiplied sufficiently to induce a change of the optical properties of the spatial light modulator material. The localized current causes localized ohmic heating; the heating modifies the local carrier density and electronic structure. This results in a refractive index change that is proportional to the average supplied electrical current. Since the refractive index change is so localized no pixellation is required allowing for simplicity of fabrication and low cost manufacturing. The localized change in the index of refraction causes a localized change in the optical path length at that position in the wavefront. Consequently, only those localized positions, as addressed by the driver beam, will experience the change in optical path length. The wavefront will then be phase-shifted at the position in question as a result of the optical path length change.

This present invention can be used in a number of optical applications. For example, suppose a user is imaging an object through a long distance in the atmosphere. Without a phase correction, the image will be smeared out and its features may be unresolvable. With the present active phase corrector in place, the scrambled optical phase can be reconstructed to its original condition before the atmosphere introduced aberrations. Another use is for long-distance optical communications. When an optical signal is received, it is introduced into an optical fiber for signal handling and processing. Unfortunately, phase distortions will not allow the beam to be focused to a small spot, so that not all the signal will go into the fiber, causing a loss of encoded information. Phase correction enables the entire optical signal to be focused into the fiber. In optical microlithography used in semiconductor processing, it is essential to hold the laser to a small controlled focus spot. The environment in which the processing occurs causes huge distortions to occur and phase control is essential for good yields. This device can be used in that environment to compensate for phase distortions that are caused there.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

What is claimed is:

1. An active optical system for phase-shifting desired portions of an incoming optical wavefront, comprising:
    a) a first control optics assembly for receiving an incoming optical wavefront and adjusting that incoming optical wavefront in accordance with first desired wavelength and beam propagation parameters;
    b) a driver element for producing a driver optical wavefront;
    c) a second control optics assembly for receiving said driver optical wavefront and adjusting that driver optical wavefront in accordance with second desired wavelength and beam propagation parameters;
    d) a combiner for receiving an output from the first control optics assembly and an output from the second control optics assembly, said combiner providing a combined, co-linear propagation output wavefront having an initial beam size;
    e) spatial light modulator (SLM) addressing optics for receiving the combined, co-linear propagation output wavefront and producing a desired beam size for the combined, co-linear propagation output wavefront;
    f) an SLM for receiving the output from the SLM addressing optics and providing localized phased shifting of the resulting wavefront; and,
    g) SLM egressing optics for receiving the output of the SLM and returning the beam size of the wavefront to the initial beam size, the output of the SLM egressing optics having desired portions of its phase shifted relative to the incoming optical wavefront.

2. The active optical system of claim 1, wherein said first control optics assembly, comprises:
    a) a first wavelength control element for receiving the incoming optical wavefront; and,
    b) a first propagation control element for receiving the output of the wavelength control element and providing an output to said combiner.

3. The active optical system of claim 2, wherein said first control optics further includes a first polarization control element.

4. The active optical system of claim 1, wherein said driver element comprises a laser.

5. The active optical system of claim 1, wherein said driver element comprises a light emitting diode (LED).

6. The active optical system of claim 1, wherein said driver element comprises a broadband optical light source.

7. The active optical system of claim 1, wherein said second control optics assembly, comprises:
    a) a second wavelength control element for receiving the driver optical wavefront; and,
    b) a second propagation control element for receiving the output of the second wavelength control element and providing an output to said combiner.

8. The active optical system of claim 1, wherein said first control optics assembly further includes a second polarization control element.

9. The active optical system of claim 1, wherein said combiner comprises a beamsplitter.

10. The active optical system of claim 1, wherein said combiner comprises a dichroic optic.

11. The active optical system of claim 1, wherein said combiner comprises a diffraction grating.

12. The active optical system of claim 1, wherein said SLM, comprises:
    a) an avalanche photodiode;
    b) an electric field across the photodiode in excess of the breakdown field to cause avalanching of electrons in the photodiode when the photons from the driver optical wavefront strike the photodiode, wherein the avalanching electrons induce a photorefractive response which changes the index of the index refraction in the photodiode; and,
    c) a circuit for regulating the electric field applied across the photodiode, wherein a thermo-optic response causes a change in the index of refraction in the photodiode.

13. A method for phase-shifting desired portions of an incoming optical wavefront, comprising the steps of:
    a) adjusting an incoming optical wavefront in accordance with first desired wavelength and beam propagation parameters;
    b) producing a driver optical wavefront;
    c) adjusting said driver optical wavefront in accordance with second desired wavelength and beam propagation parameters;
    d) combining the adjusted incoming optical wavefront and the adjusted driver optical wavefront to provide a combined, co-linear propagation output wavefront having an initial beam size;
    e) producing a desired beam size for the combined, co-linear propagation output wavefront;
    h) providing localized phased shifting of the beam size modified combined, co-linear propagation output wavefront; and,
    i) returning the combined, co-linear propagation output wavefront to said initial beam size, the resulting optical wavefront having desired portions of its phase shifted relative to the incoming optical wavefront.

14. The method of claim 13, wherein said step of adjusting said incoming optical wavefront comprises:
    utilizing a first wavelength control element for receiving the incoming optical wavefront; and,
    utilizing a first propagation control element for receiving the output of the first wavelength control element.

15. The method of claim 14, wherein said step of adjusting said incoming optical wavefront comprises:
    utilizing a second wavelength control element for receiving the driver optical wavefront; and,
    utilizing a second propagation control element for receiving the output of the second wavelength control element.

16. An active optical system for phase-shifting desired portions of an incoming optical wavefront, comprising:
    a) a first control optics assembly for receiving an incoming optical wavefront and adjusting that incoming optical wavefront in accordance with first desired wavelength and beam propagation parameters, said first control optics comprising first wavelength control element for receiving the incoming optical wavefront, a first propagation control element for receiving the output of the wavelength control element; and a first polarization control element for receiving the output of said first propagation control element;

b) a driver element for producing a driver optical wavefront, said driver element comprising a laser;

c) a second control optics assembly for receiving said driver optical wavefront and adjusting that driver optical wavefront in accordance with second desired wavelength and beam propagation parameters;

d) a combiner for receiving an output from the first control optics assembly and an output from the second control optics assembly, said combiner providing a combined, co-linear propagation output wavefront having an initial beam size;

e) spatial light modulator (SLM) addressing optics for receiving the combined, co-linear propagation output wavefront and producing a desired beam size for the combined, co-linear propagation output wavefront;

f) an SLM for receiving the output from the SLM addressing optics and providing localized phased shifting of the resulting wavefront; and, g) SLM egressing optics for receiving the output of the SLM and returning the beam size of the wavefront to the initial beam size, the output of the SLM egressing element having desired portions of its phase shifted relative to the incoming optical wavefront.

* * * * *